US012797991B2

(12) United States Patent
Erdmann et al.

(10) Patent No.: US 12,797,991 B2
(45) Date of Patent: Nov. 17, 2026

(54) SYSTEMS AND METHODS TO MITIGATE AUDIBLE NOISE IN WELDING-TYPE POWER SUPPLIES

(71) Applicant: ILLINOIS TOOL WORKS INC., Glenview, IL (US)

(72) Inventors: Jeremy John Erdmann, Appleton, WI (US); Maxwell Bode Brock, Appleton, WI (US); Craig Steven Knoener, Appleton, WI (US); Suneesh Thovarayi, Appleton, WI (US); Alan Adam Manthe, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/962,616

(22) Filed: Oct. 10, 2022

(65) Prior Publication Data

US 2023/0063774 A1 Mar. 2, 2023

Related U.S. Application Data

(63) Continuation of application No. 16/044,807, filed on Jul. 25, 2018.

(51) Int. Cl.
*B23K 9/10* (2006.01)
*B23K 9/09* (2006.01)
(Continued)

(52) U.S. Cl.
CPC ............ *B23K 9/1012* (2013.01); *B23K 9/095* (2013.01); *B23K 9/1006* (2013.01);
(Continued)

(58) Field of Classification Search
CPC .... B23K 9/1012; B23K 9/1056; B23K 9/095; B23K 9/1006; B23K 9/1043; B23K 9/1081; B23K 9/091; H02M 3/1582; H02M 1/007
(Continued)

(56) References Cited

U.S. PATENT DOCUMENTS 4,117,303 A * 9/1978 Hedberg ............. B23K 9/1006 219/130.21
4,453,073 A * 6/1984 Bredenkamp ..... H02M 7/53835 363/37

(Continued)

FOREIGN PATENT DOCUMENTS

GB 2046537 A * 11/1980 ............. B23K 9/073
WO WO-2008122734 A2 * 10/2008 ........... B23K 11/257

OTHER PUBLICATIONS

Machine English Translation of WO-2008122734-A2 (Year: 2008).*

(Continued)

*Primary Examiner* — Erwin J Wunderlich

(74) *Attorney, Agent, or Firm* — McAndrews, Held & Malloy, Ltd

(57) ABSTRACT

In some examples, apparatus, systems, and/or methods for mitigating audible noise generated by a welding-type power supply may involve changing a switching frequency of the welding-type power supply to a frequency that is outside the audible range for humans. This strategy takes advantage of the fact that the observed audible noise is generated by vibrating components within the welding-type power supply that vibrate at a frequency related to the switching frequency. Other noise mitigation strategies include dithering and deactivation of portions of the welding-type power supply that vibrate to generate the audible noise.

12 Claims, 5 Drawing Sheets

(51) Int. Cl.
*B23K 9/095* (2006.01)
*H02M 3/158* (2006.01)
*H02M 1/00* (2007.01)

(52) U.S. Cl.
CPC .......... *B23K 9/1043* (2013.01); *B23K 9/1081* (2013.01); *H02M 3/1582* (2013.01); *B23K 9/091* (2013.01); *H02M 1/007* (2021.05)

(58) Field of Classification Search
USPC ........................................................ 219/130.1
See application file for complete search history.

(56) References Cited

U.S. PATENT DOCUMENTS

| | | | | | |
|---|---|---|---|---|---|
| 4,520,255 | A * | 5/1985 | Bredenkamp | H02M 7/5383 | 363/17 |
| 4,564,742 | A | 1/1986 | Karlsson | | |
| 4,866,247 | A | 9/1989 | Parks | | |
| 4,876,433 | A * | 10/1989 | Kashima | B23K 9/1056 | 219/130.51 |
| 5,138,132 | A * | 8/1992 | Baurle | B23K 9/095 | 219/130.51 |
| 5,149,933 | A * | 9/1992 | Donner | H02M 3/156 | 219/113 |
| 5,349,157 | A * | 9/1994 | Blankenship | H02M 3/285 | 323/258 |
| 5,351,175 | A * | 9/1994 | Blankenship | B23K 9/1056 | 363/16 |
| 5,406,051 | A | 4/1995 | Lai | | |
| 5,748,461 | A | 5/1998 | Preller | | |
| 5,844,193 | A * | 12/1998 | Nomura | B23K 11/24 | 219/110 |
| 6,248,976 | B1 * | 6/2001 | Blankenship | B23K 9/0953 | 219/130.21 |
| 6,441,342 | B1 | 8/2002 | Hsu | | |
| 6,504,132 | B1 * | 1/2003 | Church | B23K 9/1043 | 219/130.33 |
| 6,515,259 | B1 * | 2/2003 | Hsu | B23K 9/092 | 219/130.51 |
| 7,183,517 | B2 * | 2/2007 | Albrecht | B23K 9/1081 | 219/130.4 |
| 8,455,794 | B2 | 6/2013 | Vogel | | |
| 8,737,102 | B2 | 5/2014 | Wagoner et al. | | |
| 8,785,816 | B2 * | 7/2014 | Kooken | B23K 9/1043 | 219/130.1 |
| 8,879,280 | B2 | 11/2014 | Lim et al. | | |
| 9,061,365 | B2 | 6/2015 | Ueda et al. | | |
| 9,152,193 | B2 | 10/2015 | Costa et al. | | |
| 9,259,796 | B2 * | 2/2016 | Peters | B23K 9/0953 | |
| 9,492,880 | B2 | 11/2016 | Vogel | | |
| 9,591,423 | B2 | 3/2017 | Keskin et al. | | |
| 9,751,150 | B2 * | 9/2017 | Daniel | B23K 9/09 | |
| 9,855,620 | B2 * | 1/2018 | Kooken | B23K 9/091 | |
| 9,862,052 | B2 * | 1/2018 | Vogel | H02M 7/4833 | |
| 9,919,376 | B2 * | 3/2018 | Starzengruber | H02M 3/1582 | |
| 10,009,968 | B2 * | 6/2018 | Chen | H05B 45/38 | |
| 11,161,193 | B2 * | 11/2021 | Schartner | H02M 3/285 | |
| 2003/0066823 | A1 * | 4/2003 | DeCoster | B23K 9/1056 | 219/130.21 |
| 2005/0109748 | A1 * | 5/2005 | Albrecht | B23K 9/1056 | 219/130.1 |
| 2005/0122056 | A1 * | 6/2005 | Langeslag | H02M 3/3385 | 315/276 |
| 2005/0212502 | A1 | 9/2005 | Casey et al. | | |
| 2006/0011595 | A1 | 1/2006 | Daniel | | |
| 2007/0051712 | A1 * | 3/2007 | Kooken | B23K 9/1043 | 219/130.1 |
| 2007/0102408 | A1 | 5/2007 | Peters | | |
| 2007/0215585 | A1 * | 9/2007 | O'Connor | B23K 9/1081 | 219/130.1 |
| 2007/0251932 | A1 * | 11/2007 | Vogel | B23K 9/0672 | 219/130.4 |
| 2008/0264915 | A1 * | 10/2008 | Manthe | B23K 9/0673 | 219/130.31 |
| 2010/0193487 | A1 * | 8/2010 | Geissler | B23K 9/1043 | 219/130.1 |
| 2010/0230394 | A1 | 9/2010 | Yokota et al. | | |
| 2015/0060426 | A1 * | 3/2015 | Schartner | B23K 9/173 | 219/130.21 |
| 2016/0129521 | A1 * | 5/2016 | Wiryadinata | B23K 9/1043 | 219/130.21 |
| 2016/0175961 | A1 * | 6/2016 | Denis | B23K 9/067 | 219/130.4 |
| 2017/0189986 | A1 | 7/2017 | Henry | | |
| 2026/0001156 | A1 * | 1/2026 | Dickinson | B23K 9/1006 | |

OTHER PUBLICATIONS

International Searching Authority, "Search Report and Written Opinion," issued in connection with International Patent Application No. PCT/US2019/037315, mailed Oct. 18, 2019, 17 pages.

* cited by examiner

SYSTEMS AND METHODS TO MITIGATE AUDIBLE NOISE IN WELDING-TYPE POWER SUPPLIES

CROSS REFERENCE TO RELATED APPLICATIONS

The present application is a continuation of U.S. Non-Provisional application Ser. No. 16/044,807 filed Jul. 25, 2018, entitled "SYSTEMS AND METHODS TO MITIGATE AUDIBLE NOISE IN WELDING-TYPE POWER SUPPLIES," the entire contents of which are hereby incorporated by reference.

TECHNICAL FIELD

The present disclosure generally relates to welding-type power supplies and, more particularly, to systems and methods to mitigate audible noise in welding-type power supplies.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components. Some conventional welding-type power supplies have been observed to generate audible noise. The audible noise was of sufficient intensity and pitch can be inconvenient and/or distracting to users of the equipment.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to systems and methods to mitigate audible noise in welding-type power supplies, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
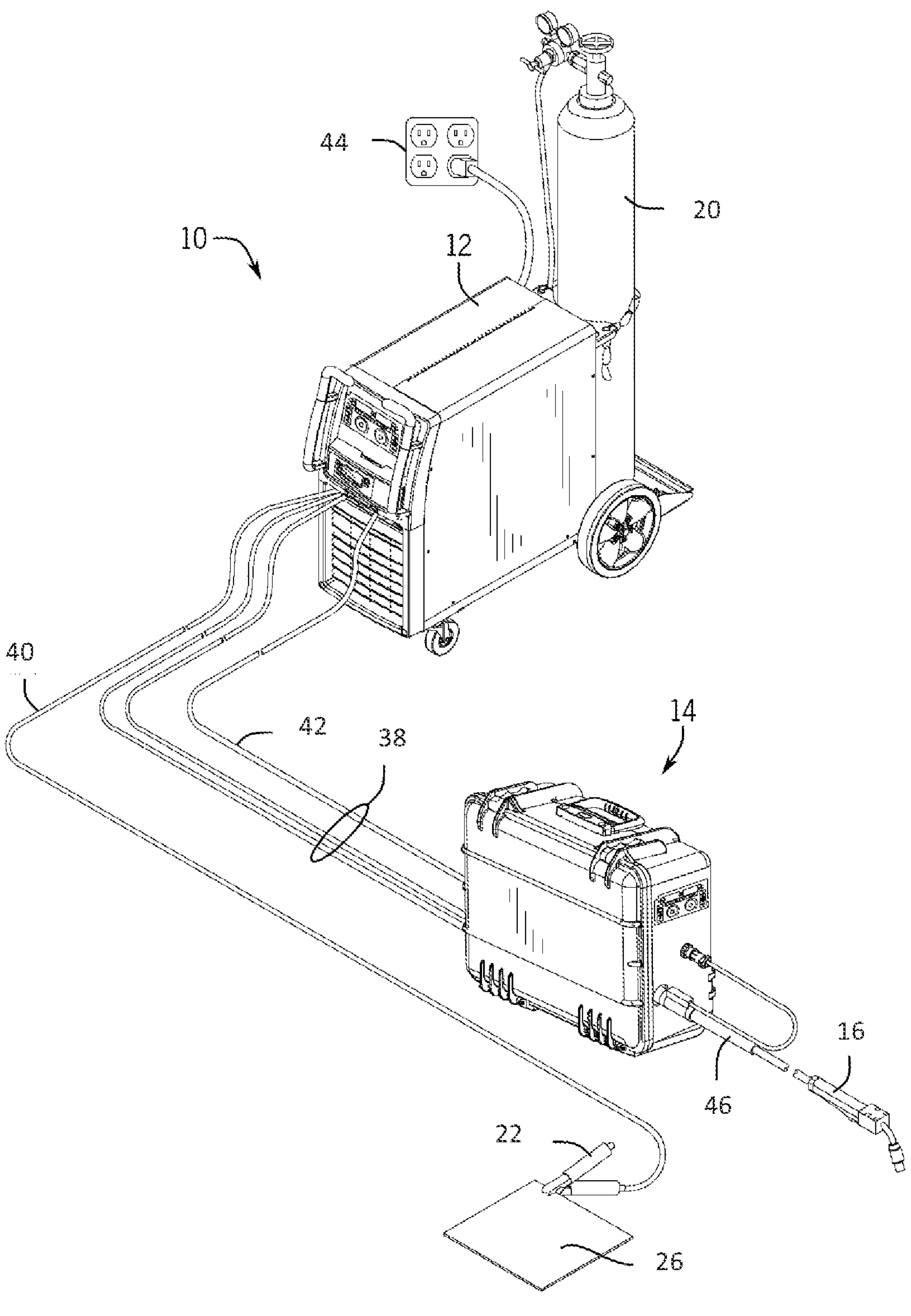
FIG. 1 illustrates an example of a welding-type system, in accordance with aspects of this disclosure.

The figures are not necessarily to scale. Where appropriate, the same or similar reference numerals are used in the figures to refer to similar or identical elements. For example, reference numerals utilizing lettering (e.g., controllable circuit element 308*a*, controllable circuit element 308*b*) refer to instances of the same reference numeral that does not have the lettering (e.g., controllable circuit elements 308).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term “memory” and/or “memory device” means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term “power” is used throughout this specification for convenience, but also includes related measures such as energy, current, voltage, and enthalpy. For example, controlling “power” may involve controlling voltage, current, energy, and/or enthalpy, and/or controlling based on “power” may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some examples of the present disclosure relate to a welding-type power supply, comprising power conversion circuitry configured to convert input power to welding-type output power, and control circuitry configured to control the power conversion circuitry using a control signal, the control signal having a signal frequency, and the control circuitry configured to set the signal frequency based on a load state, wherein the control circuitry is configured to set the signal frequency to a second frequency outside of an audible frequency range in response to the load state comprising a low load.

In some examples, the load state comprises a high load or a low load. In some examples, the load state comprises a high load when the welding-type output power is used during a welding-type operation and the low load when the welding-type output power is not used during a welding-type operation. In some examples, the control circuitry is configured to set the signal frequency to a first frequency in response to the load state comprising the high load, and to the second frequency in response to the load state comprising the low load. In some examples, the first frequency is within the audible frequency range. In some examples, the second frequency is higher than the first frequency. In some examples, the first frequency is between approximately 7 kHz and 15 kHz, and the second frequency is not between approximately 7 kHz and 15 kHz. In some examples, the power conversion circuitry comprises a stacked boost converter having a controllable circuit element, the controllable circuit element configured to switch between a first state and a second state based on the control signal.

Some examples of the present disclosure relate to a welding-type system, comprising a welding-type instrument configured to use welding-type output power during a welding-type operation, and a welding-type power supply, comprising power conversion circuitry configured to convert input power to the welding-type output power, and control circuitry configured to control the power conversion circuitry using a control signal, the control signal having a signal frequency, and the control circuitry configured to set the signal frequency based on a load state, wherein the control circuitry is configured to set the signal frequency to a second frequency outside of an audible frequency range in response to the load state comprising a low load.

In some examples, the load state comprises a high load when the welding-type instrument is conducting the welding-type operation and the low load when the welding-type instrument is not conducting the welding-type operation. In some examples, the control circuitry is configured to set the signal frequency to a first frequency in response to the load state comprising the high load, and to the second frequency in response to the load state comprising the low load. In some examples, the second frequency is zero. In some examples, the control circuitry is further configured to set the signal frequency to a third frequency in response to the load state comprising the low load. In some examples, the first frequency is within the audible frequency range. In some examples, the first frequency is between approximately 7 kHz and 15 kHz, and the second frequency is not between approximately 7 kHz and 15 kHz.

Some examples of the present disclosure relate to a method for controlling a welding-type power supply, comprising determining a load state of a welding-type power supply, setting a non-zero signal frequency of a control signal based on the load state, wherein the signal frequency is set to a second frequency outside of an audible frequency range in response to the load state comprising a low load, and controlling power conversion circuitry of the welding-type power supply using the control signal.

In some examples, determining the load state comprises determining whether an inverter of the power conversion circuitry is active. In some examples, determining whether the inverter is active comprises determining whether a welding-type operation is active. In some examples, the load state comprises a high load when the welding-type operation or the inverter is active and the low load when the welding-type operation or the inverter is inactive. In some examples, determining the load state comprises predicting a future load state based on sensor input. In some examples, setting the signal frequency comprises setting the signal frequency to a first frequency when the load state is a high load and setting the signal frequency to the second frequency when the load state is the low load, the second frequency being higher than the first frequency.

Some examples of the present disclosure relate to welding-type power supplies with audible noise mitigation. In some circumstances, audible noise (e.g., a beeping and/or tone) is generated by some welding-type power supplies. Sources of noise may include combination(s) of vibrating components in power conversion circuitry of the welding-type power supplies. For example, a combination of vibrating components of a boost converter in the power conversion circuitry, such as the input inductor, precharge relays, and boost capacitor, may cause audible noise. The vibration has been observed to occur at frequencies related to a switching frequency of the boost converter (i.e., the frequency at which certain controllable circuit elements used in the boost converter are "switched" from one state to another).

The present disclosure contemplates certain systems, methods, operations, and/or strategies that may mitigate the occurrence and/or unpleasantness of the audible noise. For example, the present disclosure contemplates dynamically changing the switching frequency to combat the noise. In some examples, control circuitry that controls the boost converter controls the switching frequency to be outside the typical audible range for humans. This strategy takes advantage of the fact that the vibrating components that generate the audible noise were observed to vibrate at a frequency related to the switching frequency (which was in the audible range for humans when the audible noise was observed). By dynamically changing the switching frequency to a frequency outside the audible range, the control circuitry controls the noise to be inaudible to human cars.

Operating at a substantially different frequency while under a heavy load may result in undesirable thermal loading of the power supply. However, the thermal implications of the inaudible switching frequency may be significantly less under a low load (e.g., when no welding-type operation is taking place) than under a heavy load. At least in systems in which audible noise is limited to periods of relatively low load (and/or power consumption), some of the disclosed systems and methods involve dynamically switching to an inaudible switching frequency (and/or to more than one inaudible switching frequencies) during periods of low load.

Other disclosed systems and methods provide mitigation of audible noise by dithering (and/or randomizing), the switching frequency to spread out the magnitude of the observed frequency over a wider range of frequencies with smaller magnitude.

Still other disclosed systems and methods involve deactivating the boost converter completely during low loads to mitigate the audible noise. Disclosed example systems and methods reactivate the boost converter after deactivation while avoiding potential system stability challenges (e.g., transformer saturation) which can occur during periods of higher loads.

Thus, the present disclosure contemplates welding-type power supplies that undertake certain noise mitigation strategies when under a low load (and/or low power consumption, burst/idle mode, etc.), so as to reduce and/or prevent the power supply from producing unwanted audible noise.

Figure 2:
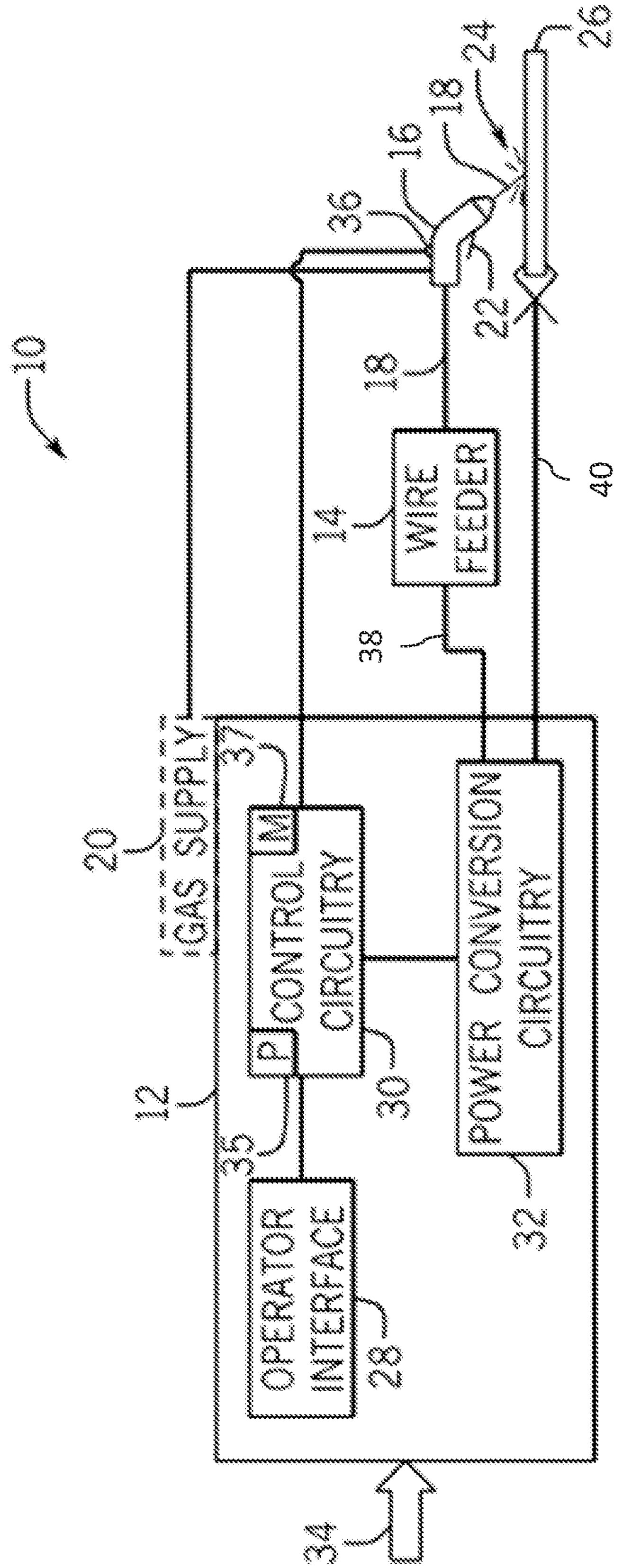
FIG. 2 is a block diagram of the example welding-type system of FIG. 1, in accordance with aspects of this disclosure.

FIGS. 1 and 2 show a perspective view and block diagram view, respectively, of an example of a welding-type system 10. It should be appreciated that, while the example welding-type system 10 shown in FIGS. 1 and 2 may be described as a gas metal arc welding (GMAW) system, the presently disclosed system may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes) or other metal fabrication systems, such as plasma cutting systems, induction heating systems, and so forth.

In the example of FIG. 1, the welding-type system 10 includes a welding-type power supply 12 (i.e., a welding-type power source), a welding wire feeder 14, a gas supply 20, and a welding torch 16. The welding-type power supply 12 generally supplies power for the welding-type system 10 and/or other various accessories, and may be coupled to the welding wire feeder 14 via one or more weld cables 38, as well as coupled to a work piece 26 using a lead cable 40 having a clamp 22. In the illustrated example, the welding wire feeder 14 is coupled to the welding torch 16 via coupler 46 in order to supply welding wire and/or welding-type power to the welding torch 16 during operation of the welding-type system 10. In some examples, the welding-type power supply 12 may couple and/or directly supply welding-type power to the welding torch 16. In the illustrated example, the power supply 12 is separate from the wire feeder 14, such that the wire feeder 14 may be positioned at some distance from the power supply 12 near a welding location. However, it should be understood that the wire feeder 14, in some examples, may be integral with the power supply 12. In some examples, the wire feeder 14 may be omitted from the system 10 entirely.

In the examples of FIGS. 1 and 2, the welding-type system 10 includes a gas supply 20 that may supply a shielding gas and/or shielding gas mixtures to the welding torch 16. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In the example of FIG. 1, the gas supply 20 is coupled to the welding torch 16 through the wire feeder 14 via a gas conduit 42 that is part of the weld cables 38 from the welding-type power supply 12. In such an example, the welding wire feeder 14 may regulate the flow of gas from the gas supply 20 to the welding torch 16. In the example of FIG. 2, the gas supply 20 is depicted as coupled directly to the welding torch 16 rather than being coupled to the welding torch 16 through the wire feeder 14.

In the example of FIG. 2, the wire feeder 14 supplies a wire electrode 18 (e.g., solid wire, cored wire, coated wire) to the torch 16. The gas supply 20, which may be integral with or separate from the power supply 12, supplies a gas (e.g., CO2, argon) to the torch 16. In some examples, no gas supply 20 may be used. The welding-type power supply 12 may power the welding wire feeder 14 that, in turn, powers the welding torch 16, in accordance with demands of the welding-type system 10. The lead cable 40 terminating in the clamp 22 couples the welding-type power supply 12 to the work piece 26 to close the circuit between the welding-type power supply 12, the work piece 26, and the welding torch 16. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In the example of FIG. 2, the welding-type power supply 12 includes an operator interface 28, control circuitry 30, and power conversion circuitry 32. In some examples, the welding-type system 10 may receive weld settings from the operator via the operator interface 28 provided on the power supply 12 (and/or power source housing, such as on a front panel of the power source housing, for example). The weld settings may relate to the type of welding-type power desired. In the example of FIG. 2, the operator interface 28 is coupled to the control circuitry 30, and may communicate the weld settings to the control circuitry 30 via this coupling.

In the example of FIG. 2, the welding-type power supply 12 includes power conversion circuitry 32 that receives input power from a power source (e.g., the AC power grid, an engine/generator set, or a combination thereof), conditions the input power, and provides DC and/or AC welding-type output power via the weld cable(s) 38 and/or lead cable 40. In the example of FIG. 2, the source of electrical power is indicated by arrow 34. The source may be a power grid, an engine-driven generator, batteries, fuel cells or other alternative sources. In the example of FIG. 1, the source is an electrical outlet 44. The power conversion circuitry 32 may include circuit elements (e.g., transformers, rectifiers, capacitors, inductors, diodes, transistors, switches, and so forth) capable of converting the AC input power to a direct current electrode positive (DCEP) output, direct current electrode negative (DCEN) output, DC variable polarity, and/or a variable balance (e.g., balanced or unbalanced) AC output, as dictated by the demands of the welding-type system 10 (e.g., based on the type of welding process performed by the welding-type system 10, and so forth).

In the example of FIG. 2, the control circuitry 30 is coupled to the power conversion circuitry 32. In some examples, the control circuitry 30 operates to control the conversion circuitry 32, so as to ensure the conversion circuitry 32 generates the appropriate welding-type power for carrying out the desired welding-type operation. In some examples, the control circuitry 30 may control the power conversion circuitry 32 to produce an appropriate and/or desired current and/or voltage of the welding-type power supplied to the torch 16, as selected, for example, by an operator through the operator interface 28.

In the example of FIG. 2, the control circuitry comprises one or more processors 35 and/or memory 37. The processor (s) 35 may include one or more microprocessors, such as one or more "general-purpose" microprocessors, one or more special-purpose microprocessors and/or application specific integrated circuits (ASICS), or some combination thereof. For example, the processor(s) may include one or more reduced instruction set (RISC) processors (e.g., Advanced RISC Machine (ARM) processors), one or more digital signal processors (DSPs), and/or other appropriate processors. The one or more processors 35 may use data stored in the memory 37 to execute control algorithms. The data stored in the memory 37 may be received via the operator interface 28, one or more input/output ports, a network connection, and/or be preloaded prior to assembly of the control circuitry 30.

The control circuitry 30 may monitor the current and/or voltage of the arc 24 using on one or more sensors 36 positioned on, within, along, and/or proximate to the wire feeder 14, weld cable 38, and/or torch 16. The one or more sensors 36 may comprise, for example, current sensors, voltage sensors, impedance sensors, temperature sensors, acoustic sensors, and/or other appropriate sensors. In some examples, the control circuitry 30 may determine and/or control the power conversion circuitry 32 to produce an appropriate power output, arc length, and/or electrode extension based at least in part on feedback from the sensors 36.

Figure 3:
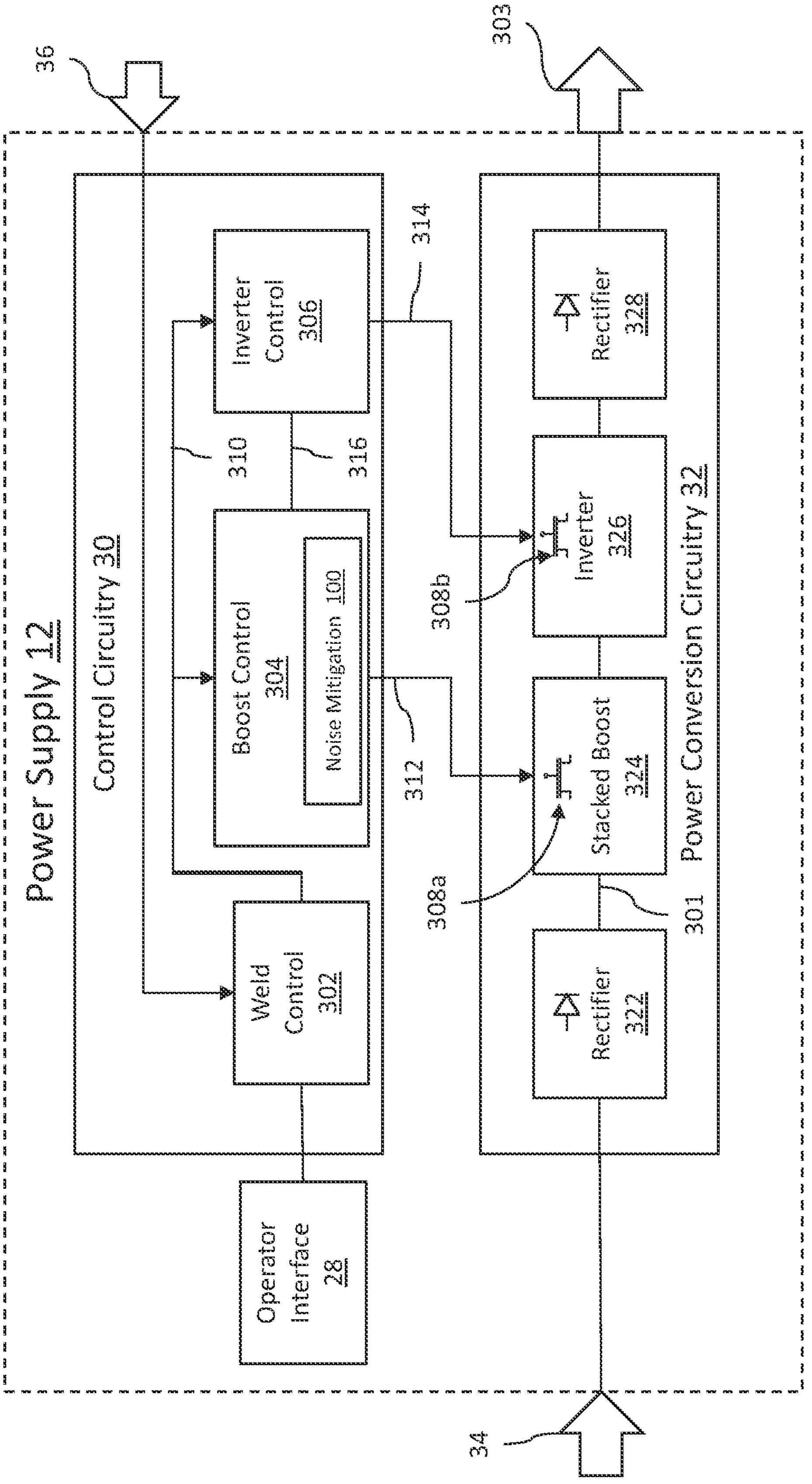
FIG. 3 is a block diagram of an example welding-type power supply, in accordance with aspects of this disclosure.

FIG. 3 shows a more detailed view of the control circuitry 30 and power conversion circuitry 32 of the welding-type power supply 12. In some examples, the power supply 12 may comprise a switched mode power supply. As shown, the power conversion circuitry 32 includes an input rectifier 322, a stacked boost converter 324, an inverter 326, and an output rectifier 328, connected along a common bus 301. In some examples, the input rectifier 322 and/or output rectifier 328 may be half wave rectifiers or full wave rectifiers. In some examples, the inverter 326 has a half bridge topology or a full bridge topology, though other topologies may be used. In some examples, the stacked boost converter 324 may be a more traditional boost converter. In some examples, the stacked boost converter 324 may be a more general pre-regulator, such as, for example, a boost converter, a buck converter, and/or be a boost/buck converter.

In operation, the input rectifier 322 rectifies the AC input power 34 to DC power. The stacked boost converter 324 may then step up (and/or "boost") the DC power as desired. In examples where the stacked boost converter 324 includes a buck converter, the DC power may also be stepped down (or "bucked"). The inverter 326 may then invert the DC power to AC power to achieve additional power performance. Finally, the output rectifier 328 converts the AC power back to DC power for output (as shown, via arrow 303) to the previously discussed welding components (e.g., wire feeder 14 and/or welding torch 16). In some examples, welding components may use AC rather than DC power, and the output rectifier 328 may be omitted or bypassed.

In the example of FIG. 3, the control circuitry 30 includes a weld controller 302, a boost controller 304, and an inverter controller 306. As shown, the boost controller 304 controls the stacked boost converter 324, and the inverter controller 306 controls the inverter 326. More particularly, the boost controller 304 outputs one or more boost control signals to the stacked boost converter 324 via line 312, and the inverter controller 306 outputs one or more inverter control signals to the inverter 326 via line 314. In some examples, the weld controller 302, boost controller 304, and/or inverter controller 306 may be implemented through one or more single integrated circuit package and/or through one or more discrete circuits. In some examples, the weld controller 302, boost controller 304, and/or inverter controller 306 may be implemented through one or more processors 35 executing machine readable instructions stored in one or more memories 37.

In the example of FIG. 3, the stacked boost converter 324 includes controllable circuit elements 308*a*, and the inverter 326 includes one or more controllable circuit elements 308*b*. The controllable circuit elements 308 (e.g., transistors, switches, relays etc.) are configured to change states (e.g., open/close, turn off/on, etc.) in response to (and/or according to) the boost control signal(s) and/or inverter control signal (s), respectively. In examples where the controllable circuit elements comprise transistors, the transistors may comprise any suitable transistors, such as, for example MOSFETs, JFETs, IGBTs, BJTs, etc.

In some examples, the operation of the stacked boost converter 324 and/or inverter 326 may be dependent upon the boost control signal(s) and inverter control signal(s), respectively, and/or the controllable circuit elements 308 they control. For example, the power output of the stacked boost converter 324 may be dependent on (amongst other things) a duty cycle of the boost control signal(s). Likewise, the power output of the inverter 326 may be dependent on (amongst other things) a duty cycle of the inverter control signal(s).

In the example of FIG. 3, the weld controller 302 outputs one or more weld control signals to the boost controller 304 and inverter controller 306 via line 310. In some examples, the boost controller 304 and inverter controller 306 are configured to control the stacked boost converter 324 and inverter 326 using, at least in part, the weld control signal(s) (and/or data and/or information encoded in and/or represented by the weld control signal(s)). For example, the weld controller 302 may determine that more or less power (and/or voltage/current) needs to be output by the power conversion circuitry 32, and output weld control signals to the boost controller 304 and/or inverter 326 representative of this determination. The boost controller 304 and/or inverter controller 306 may adjust the boost and/or inverter control signals accordingly, such as by increasing or decreasing the duty cycle of their respective control signals, for example. Though not shown, in some examples the weld control signal(s) may be processed through a filter (such as, for example, a Proportional-Integral-Derivative (PID) controller and/or an Infinite Impulse Response (IIR) filter) before being received by the boost controller 304 and/or inverter controller 306.

In the example of FIG. 3, the weld controller 302 receives operator input from the operator interface 28 and feedback input from the various sensors 36 of the welding-type system 10. While not shown, in some examples the boost controller 304 and/or inverter controller 306 may also receive feedback input from the sensors 36 and use this input when outputting the boost control signal(s) and/or inverter control signal(s) to control the stacked boost converter 324 and/or inverter 326, respectively. In some examples, some or all of the feedback input from the various sensors 36 may be processed through a filter (such as, for example, a Proportional-Integral-Derivative (PID) controller and/or an Infinite Impulse Response (IIR) filter), before being received and/or used by the weld controller 302, boost controller 304, and/or inverter controller 306. In some examples, some or all of the feedback input from the various sensors 36 may be processed through a filter (such as, for example, a Proportional-Integral-Derivative (PID) controller and/or an Infinite Impulse Response (IIR) filter) with the weld control signal (s).

In some examples, the weld controller 302 may use the operator input and/or feedback input when generating the weld control signal(s) sent to the boost controller 304 and/or inverter 326. For example, the operator may input weld settings through the operator interface 28, which are then communicated to the weld controller 302. The weld settings may indicate a particular type of target welding operation and/or welding-type power. The feedback input may indicate the type (and/or characteristics, parameters, properties, etc.) of welding-type power being presently output by the welding-type power supply 12, via the power conversion circuitry 32. The weld controller 302 may thus determine what, if any, adjustments need to be made to welding-type power output to achieve the target welding-type power and/or operation, and output its weld control signal(s) to the boost controller 304 and/or inverter controller 306 to effect these adjustments.

In some examples, the weld controller 302 may determine, predict, and/or derive a load (and/or draw) on the welding-type power supply 12 based on operator input via the operator interface 28 and/or feedback from the feedback sensors 22, 36. For example, the weld controller 302 may receive operator input relating to the load on the welding-type power supply 12, and/or the welding-type power being used (and/or consumed, conducted, drawn, etc.), such as an indication that a certain welding-type operation is about to occur and/or command to produce a welding-type output for a certain welding-type operation. As another example, one of the sensors 22, 36 may be a torch sensor that sends one or more signals to the weld controller 302 representative of a torch activation and/or deactivation (e.g., via trigger pull/release). In such an example, the weld controller 302 may determine, derive, and/or predict there is (or soon will be) a significant load (e.g., a load greater than a threshold load, and/or above a target power and/or current output) on the welding-type power supply 12 while the torch is activated, and/or a low load (e.g., a load less than a threshold load, and/or below a target power and/or current output) when the torch is deactivated (and/or following a timeout period after deactivation).

As yet another example, one of the sensors 36 may be a foot switch sensor that sends one or more signals to the weld controller 302 representative of a foot switch activation and/or deactivation. In such an example, the weld controller 302 may determine, derive, and/or predict there is (or soon will be) a significant load on the welding-type power supply 12 while the foot switch is activated, and/or a low load when the foot switch is deactivated (and/or following a timeout period after deactivation). As an additional example, one of the feedback sensors 22, 36 may be a current sensor, and the weld controller 302 may use the current through the system to determine a load on the system (e.g., no or low current=no or low load). In some examples, one or more of the sensors 36 may be a motion sensor (e.g., an accelerometer, light sensor, video sensor, ultrasonic sensor, microwave sensor, etc.), and the weld controller 302 may determine, derive, and/or predict a significant load when the motion sensor detects motion of an associated welding component (e.g., the welding torch 16 and/or workpiece 26). In some examples, the weld controller 302 may receive one or more signals from one or more sensors 36 that indicate an immediate and/or impending short circuit and/or a break in the arc 24, and the weld controller 302 may determine, derive, and/or predict the load on the system from this information. In some examples, the weld controller 302 may determine, derive, and/or predict that a short circuit and/or break in the arc 24 has occurred (or will occur) based on one or more signals from the one or more sensors 36, and determine, derive, and/or predict the load on the system from this information.

The example weld controller 302 implements certain low load (and/or burst/idle mode) procedures when the weld controller 302 detects and/or determines there is a sufficiently low load. In some examples, the weld controller 302 may compare the load on the welding-type power supply 12 to a threshold load level to determine whether there is a sufficiently low load. In some examples, the threshold load level may be programmatically determined (e.g., based on sensor input and/or operator input), stored in memory 37, entered by an operator through the operator interface, or otherwise established. Once a low load is determined, the weld controller 302 may take certain actions to increase (e.g., maximize) efficiency.

In particular, the weld controller 302 may adjust control of the boost controller 304 and/or inverter controller 306 during low loads. For example, the weld controller 302 may output one or more weld control signals to the inverter controller 306 that are representative of a command to deactivate and/or cease sending inverter control signals to the inverter 326. In some examples, the inverter controller 306 may be implemented through one or more processors 35 and/or integrated circuit packages, which function only when receiving an enable signal from the weld controller 302. In such an example, the weld controller 302 may decline to provide an enable signal (e.g., as one or more of the weld control signals sent to the inverter controller 306) during periods of low load, such that the no inverter control signals are sent to the inverter 326. Without the inverter control signals, the controllable circuit elements 308*b* of the inverter 326 may remain in a single state (e.g., off, open, deactivated, etc.) and the inverter 326 may effectively stop functioning and/or be turned off (and/or deactivated).

In some examples, the weld controller 302 may instead, or additionally, output one or more weld control signals to the inverter controller 306 representative of a command to change the frequency and/or duty cycle of its inverter control signals, so as to more effectively function in a low load state where less output power is needed. In some examples, the weld controller 302 may instead, or additionally, output one or more weld control signals to the boost controller 304 that are representative of a command to cease sending boost control signals, and/or change the frequency and/or duty cycle of the boost control signals, so as to more effectively function in a low load state where less output power is needed. In some examples, the boost controller 304 may be implemented through one or more processors 35 and/or integrated circuit packages, which function only when receiving an enable signal from the weld controller 302. In such an example, the weld controller 302 may decline to provide an enable signal (e.g., as one or more of the weld control signals sent to the boost controller 304) during periods of low load, such that the no boost control signal(s) are sent to the stacked boost converter 324.

In the example of FIG. 3, the inverter controller 306 shares a connection 316 with the boost controller 304. The inverter controller 306 and the boost controller 304 may share information and/or data through this connection 316. For example, the boost controller 304 may receive data from the inverter controller 306 indicating whether the inverter controller 306 (and/or inverter 326) is enabled or disabled (and/or activated/deactivated). In some examples, the boost controller 304 may receive data from the inverter controller 306 indicating a frequency and/or duty cycle of the inverter control signals. The boost controller 304 may determine that the power supply 12 is operating in a low load (and/or idle, burst, etc.) mode when the inverter controller 306 (and/or inverter 326) is disabled/deactivated and/or operating at a low duty cycle and/or low frequency (e.g., a frequency and/or duty cycle below an input, stored, and/or derived threshold level). In some examples, the boost controller 304 may conclude that the power supply 12 is operating at a low load based on weld control signals the boost controller 304 receives directly from the weld controller 302 (e.g., a command to reduce the duty cycle and/or frequency of the boost control signals below an input, stored, and/or derived threshold level).

In the example of FIG. 3, the boost controller 304 implements a noise mitigation procedure 100. In some examples, the noise mitigation procedure 100 may be implemented through one or more analog and/or discrete circuits. In some examples, the noise mitigation procedure 100 may be implemented through programmatic instructions saved in memory 37 and/or executed by one or more processors 35, such as in examples where some or all of the functions of the boost controller 304 are implemented by one or more processors 35 executing programmatic instructions saved in memory 37. The noise mitigation procedure 100 may be executed when the power supply 12 is under a low load (e.g., in response to a determination and/or signal indication of low load) in order to ensure that audible noise is prevented, suppressed, and/or minimized.

Figure 4:
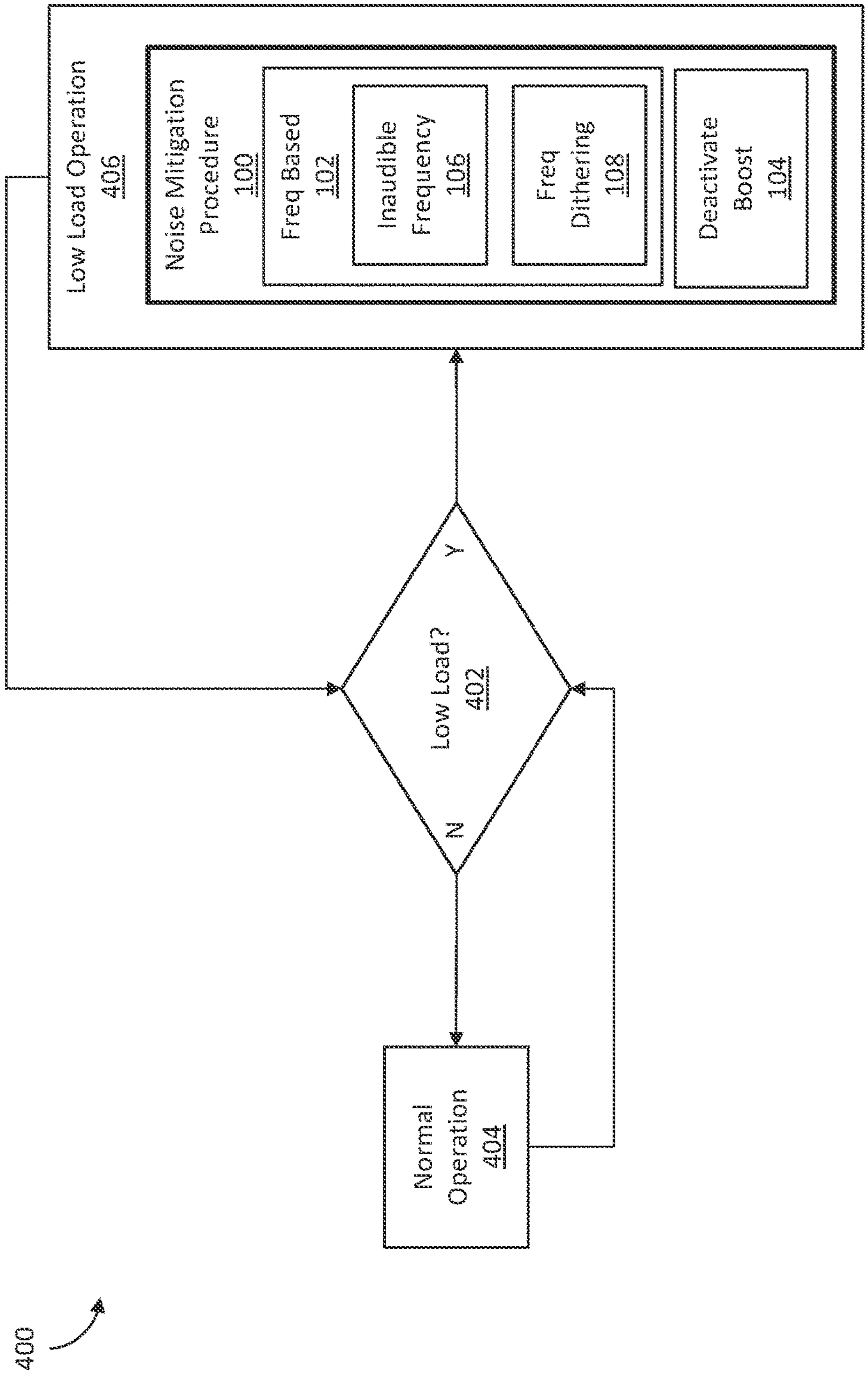
FIG. 4 is a flow chart illustrating an example method of operation of a boost controller of the example welding-type power supply of FIG. 3, in accordance with aspects of this disclosure.

FIG. 4 shows a flowchart illustrating a method 400 of operating the boost controller 304. Block 402 of the method 400 is representative of a recurring decision (and/or loop) of the method 400, where the boost controller 304 determines whether the power supply 12 is operating at a low load (and/or in a burst/idle mode). If there is not a low load (e.g., normal load, high load, etc.) then the method 400 proceeds to block 404, where normal operation of the boost controller 304 is executed. If there is a low load, then the method 400 proceeds to block 406, where the noise mitigation procedure 100 is executed.

As shown in the example of FIG. 4, the noise mitigation procedure 100 may include any one or more of several component procedures. As shown, the noise mitigation procedure 100 includes frequency based components 102, and a deactivation component 104. The frequency based components 102 includes a frequency dithering component 108 and an inaudible frequency component 106. In some examples, only one of the component procedures may actually be executed during low load. In some examples, several or all of the component procedures may be executed during low load. In some examples, the selection of component procedures to be executed and/or order of execution may be predetermined, determined via operator input, determined based on input from the sensors 36, and/or otherwise determined.

The inaudible frequency component 106 of the noise mitigation procedure 100 may change the switching frequency of the boost controller 304 (and/or stacked boost converter 324) when the power supply 12 is operating under a low load. During normal operation, the boost controller 304 (and/or stacked boost converter 324) may operate at a switching frequency of approximately 10 kHz. In some examples, the boost controller 304 (and/or stacked boost converter 324) may operate at a switching frequency between approximately 7 kHz and 15 kHz during normal operation. The inaudible frequency component 106 of the noise mitigation procedure 100 may change the switching frequency to be outside of this normal operating range. More particularly, the inaudible frequency component 106 of the noise mitigation procedure 100 may change the switching frequency to a frequency outside of the audible frequency range for humans.

The audible frequency range for humans is generally between 15 Hertz (Hz) and 18,000 Hz (or 18 kiloHertz (kHz)). Thus, in some examples, the inaudible frequency component 106 of the noise mitigation procedure 100 may change the switching frequency of the boost controller 304 (and/or stacked boost converter 324) to be approximately 19 kHz or 20 kHz. In some examples, inaudible frequency component 106 of the noise mitigation procedure 100 may change the switching frequency of the boost controller 304 (and/or stacked boost converter 324) to be above 20 kHz, such as 20.5 kHz, 21 kHz, 21.5 kHz, or 22 kHz. In some examples, the inaudible frequency component 106 of the noise mitigation procedure 100 may change the switching frequency of the boost controller 304 (and/or stacked boost converter 324) to be between approximately 18 kHz and 22 kHz. In some examples, the inaudible frequency component 106 of the noise mitigation procedure 100 may change the switching frequency of the boost controller 304 (and/or stacked boost converter 324) to be less than 18 kHz. For example, the inaudible frequency component 106 of the noise mitigation procedure 100 may change the switching frequency to be just outside of, or on the edge of, the approximately 7-15 kHz normal operating range (e.g., 14.8 kHz, 14.9 kHz, 15 kHz, 15.1 kHz, 15.2 kHz, etc.).

By changing the switching frequency to an inaudible frequency, the boost controller 304 controls the potentially vibrating components in the stacked boost converter 324 to avoid audible frequencies. By dynamically changing the switching frequency to a frequency outside the audible range during periods of low load, the boost controller 304 controls the noise generated by the vibrating components to be inaudible to human cars.

The frequency dithering component 108 of the noise mitigation procedure 100 may dither the switching frequency of the boost controller 304 (and/or stacked boost converter 324) to spread out the noise generated by the vibrating components of the stacked boost converter 324 over a wider range of frequencies with smaller magnitude. Dithering refers to an intentional application of noise to a signal in order to randomize and/or de-correlate the resulting signal. Thus, the frequency dithering component 108 may change the switching frequency of the boost controller 304 (and/or stacked boost converter 324) according to some dithering (and/or randomizing) algorithm.

In some examples, the dithering algorithm may shift the switching frequency among and/or between frequencies outside of the audible range. In some examples, the dithering algorithm may shift the switching frequency among and/or between frequencies within the audible range. In some examples, the dithering algorithm may shift the switching frequency among and/or between frequencies both within and outside of the audible range. When the switching frequency changes, the frequency of the noise produced by the vibrating components will change as well. In some examples, the dithering may be conducted continually, without regard to (high or low) load. If the dithering is done correctly, any noise generated by the vibrating components of the stacked boost converter 324 will be less audible and less distracting, and/or more subtle, subdued, and/or muted.

The deactivation component 104 of the noise mitigation procedure 100 deactivates the boost controller 304 and/or the stacked boost converter 324. More particularly, execution of the deactivation component 104 causes the boost controller 304 to cease sending boost control signals to the stacked boost converter. As the controllable circuit elements 308*a* of the stacked boost converter 324 are dependent upon the boost control signals to change state, and the stacked boost converter 324 dependent upon controllable circuit elements 308 to operate, the cessation of boost control signals may effectively deactivate and/or disable the stacked boost converter 324. Deactivated, the vibrating components of the stacked boost converter 324 will produce no audible noise.

Figure 5:
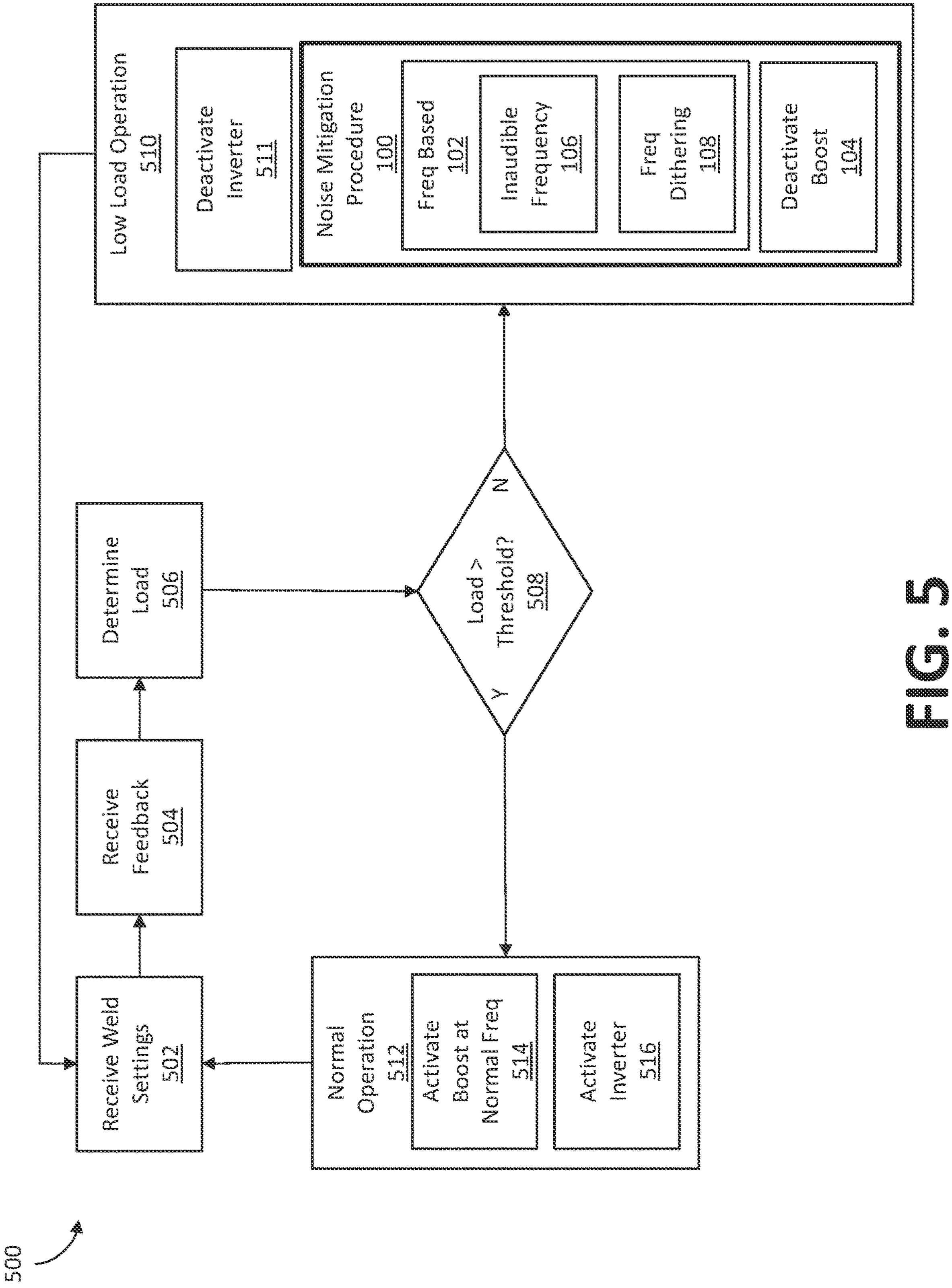
FIG. 5 is a flow chart illustrating an example method of operation of control circuitry of the example welding-type power supply of FIG. 3, in accordance with aspects of this disclosure.

FIG. 5 shows method 500 of operating the control circuitry 30 of the welding power supply 12. The method 500 may be implemented by, for example, executing machine readable instructions (e.g., stored in memory 37) using the control circuitry 30 (e.g., one or more processor 37). At block 502, the weld controller 302 receives operator input via the operator interface 28. In some examples, the block 502 may be skipped if there is no operator input and/or if the operator input is not relevant. At block 504, the weld controller 302 receives feedback from the various feedback sensors 36 of the welding-type system 10. At block 506, the weld controller 302 determines the load on the welding-type power supply 12. In some examples, this determination may be based, at least in part, on feedback input and/or operator input, as outlined above. At block 508, the weld controller 302 compares the load with a threshold load level, to determine whether the control circuitry 30 should perform a low load operation 510 or a normal operation 512.

In normal operation 512, the boost controller 304 and/or inverter controller 306 operate at a normal (e.g., default) switching frequency. As discussed above, in some examples, the normal switching frequency for the boost controller 304 (and/or stacked boost converter 324) and/or the inverter controller 306 (and/or inverter 326) may be between 7 kHz and 15 kHz (e.g., 10 kHz). At block 514, during normal operation 512, the weld controller 302 may send one or more weld control signals to activate and/or enable the boost controller 304 and/or stacked boost converter 324 at normal switching frequency. At block 516, during normal operation 512, the weld controller 302 may send one or more weld control signals to activate and/or enable the inverter controller 306 and/or inverter 326 to run at a normal switching frequency.

In some examples, where the boost controller 304 and/or stacked boost converter 324 were previously deactivated, the weld controller 302 may delay activating the inverter controller 306 and/or inverter 326 at block 516 for some time after activating the boost controller 304 and/or stacked boost converter 324 at block 514. This delay may reduce some stability challenges (e.g., transformer saturation) that may present themselves during reactivation in periods of higher loads. For example, the weld controller 302 may delay for a period of time determined by the control circuitry 30 based on operator input via the operator interface 28, and/or sensor input via the feedback sensors 36. In some examples, the weld controller 302 may delay for approximately 200 milliseconds (ms). In some examples, the weld controller 302 may delay for a period of between 100 ms and 500 ms. Following this delay, the inverter controller 306 and/or inverter 326 may be reactivated at block 516, and the method 500 may repeat beginning at block 502.

During low load operation 510, the weld controller 302 may deactivate the inverter 326 at block 511, as previously discussed. The boost controller 304 may then determine the power supply 12 is operating at a low load, based on the deactivation of the inverter controller 306, and/or on some other data, as previously described. The boost controller 304 may then execute the noise mitigation procedure 100 in response to a low load determination, as previously described.

One advantage of the present disclosure is that it is possible to implement the noise mitigation procedure 100 primarily (and/or entirely) as programmatic instructions (e.g., software), without requiring additional hardware changes and/or accommodations. This may allow the design to perform more flexibly, without adding bill of material cost. Another advantage relating to the software implementation is the design cycle time savings compared to changing hardware and repeating already completed testing.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A welding-type system, comprising:

a welding-type instrument configured to use welding-type output power during a welding-type operation; and a welding-type power supply, comprising:

power conversion circuitry configured to convert input power to the welding-type output power, the power conversion circuitry comprising a boost converter, and control circuitry configured to control the boost converter using a control signal having a signal frequency, the control circuitry being configured to:

determine a load state of the welding-type power supply, generate the control signal with a first signal frequency in response to determining the load state comprises a high load, and generate the control signal with a second signal frequency between 18 kHz and 20 kHz in response to determining the load state comprises a low load, the second signal frequency being different than the first signal frequency.

2. The welding system of claim 1, wherein the power conversion circuitry further comprises an inverter having a first controllable circuit element.

3. The welding system of claim 2, wherein the boost converter comprises a second controllable circuit element that is different than the first controllable circuit element of the inverter, the second controllable circuit element of the boost converter being configured to switch between a first state and a second state at a switching frequency corresponding to the signal frequency of the control signal.

4. The welding system of claim 3, wherein the boost converter boosts direct current (DC) power and the inverter converts the DC power that was boosted by the boost converter into alternating current (AC) power.

5. The welding system of claim 1, wherein the second signal frequency is between 19 kHz and 20 kHz.

6. The welding system of claim 1, wherein the control circuitry is configured to determine the load state based on sensor input or a tool signal indicating whether the welding-type instrument has been activated and is conducting the welding-type operation, or has been deactivated and is not conducting the welding-type operation.

7. The welding system of claim 1, wherein the first signal frequency is between 7 kHz and 15 kHz.

8. A welding-type power supply, comprising:

power conversion circuitry configured to convert input power to welding-type output power, the power conversion circuitry comprising a boost converter; and control circuitry configured to control the boost converter using a control signal having a signal frequency, the control circuitry being configured to:

determine a load state of the welding-type power supply, wherein the load state comprises the high load when the welding-type output power is used during a welding-type operation or a trigger of a welding-type instrument is pulled, and the load state comprises the low load when the welding-type output power is not used during a welding-type operation or the trigger of the welding-type instrument is not pulled, generate the control signal with a first signal frequency in response to determining the load state comprises a high load, and in response to determining the load state comprises a low load:

determine a second signal frequency based on a dithering algorithm, and generate the control signal with the second signal frequency, the boost converter producing no audible noise when the control signal has the second signal frequency.

9. The welding-type power supply of claim 8, wherein the dithering algorithm is configured to randomly change the signal frequency.

10. The welding-type power supply of claim 8, wherein the dithering algorithm is configured to randomly shift the second signal frequency among frequencies that are not between 7 kHz and 18 kHz, and the first frequency is between 7 kHz and 15 kHz.

11. The welding-type power supply of claim 8, wherein the boost converter comprises a controllable circuit element configured to switch between a first state and a second state at a switching frequency corresponding to the signal frequency of the control signal.

12. The welding-type power supply of claim 8, wherein the control circuitry comprises:

processing circuitry, and memory circuitry comprising machine readable instructions which, when executed by the processing circuitry, cause the processing circuitry to:

determine the load state of the welding-type power supply, generate the control signal with the first signal frequency in response to determining the load state comprises the high load, and in response to determining the load state comprises the low load:

determine the second signal frequency based on the dithering algorithm, and generate the control signal with the second signal frequency, the boost converter producing no audible noise when the control signal has the second signal frequency.

* * * * *